(12) United States Patent
Wong et al.

(10) Patent No.: US 8,411,058 B2
(45) Date of Patent: Apr. 2, 2013

(54) METHOD AND SYSTEM FOR TACTILE DISPLAY

(75) Inventors: Ling Jun Wong, Escondido, CA (US); True Xiong, San Diego, CA (US)

(73) Assignee: Sony Corporation, Tokyo (JP)

(*) Notice: Subject to any disclaimer, the term of this patent is extended or adjusted under 35 U.S.C. 154(b) by 281 days.

(21) Appl. No.: 12/869,558

(22) Filed: Aug. 26, 2010

(65) Prior Publication Data
US 2012/0050172 A1    Mar. 1, 2012

(51) Int. Cl.
*G06F 3/041* (2006.01)
*G06F 3/01* (2006.01)
*G09B 21/00* (2006.01)

(52) U.S. Cl. ............ 345/173; 178/18.01; 715/701; 434/113

(58) Field of Classification Search ........ 345/173–177, 345/179; 178/18.01–18.11, 19.01; 715/701, 715/702, 865; 434/113–114
See application file for complete search history.

(56) References Cited

U.S. PATENT DOCUMENTS

| 6,703,924 | B2* | 3/2004 | Tecu et al. ............ 340/407.1 |
| 7,744,372 | B1 | 6/2010 | Minnich et al. |
| 2007/0268245 | A1* | 11/2007 | Sugita et al. ............ 345/107 |
| 2011/0155478 | A1* | 6/2011 | Choi et al. ............ 178/18.03 |

FOREIGN PATENT DOCUMENTS

| CA | 2169198 | * | 8/1997 |
| JP | 2001337596 | | 12/2001 |
| JP | 2002278444 | | 9/2002 |

OTHER PUBLICATIONS

"Thermoelectric cooling". From Wikipedia. <http://en.wikipedia.org/wiki/Thermoelectric_cooling> Jun. 28, 2010. 3 pages.

* cited by examiner

*Primary Examiner* — Kent Chang
*Assistant Examiner* — Scott Au
(74) *Attorney, Agent, or Firm* — Sony Corporation (57) ABSTRACT

A system and method for a touch display system. The a touch display system includes: a flat touch display assembly including a matrix of flat Braille pixels, wherein each flat Braille pixel is operable to be placed in one of two states. A heating source is selectively connected to each flat Braille pixel. A cooling source selectively connected to each flat Braille pixel. The flat Braille pixels are configured to represent images to touch by selective heating and cooling thereof. In one embodiment, the above described display can be used in combination with software that automatically converts text to Braille which is displayed using the flat touch display assembly.

13 Claims, 8 Drawing Sheets

METHOD AND SYSTEM FOR TACTILE DISPLAY

FIELD

Embodiments according to the present invention generally relate to touch systems, in particular to Braille systems for the vision impaired.

BACKGROUND

Braille is the language of visually impaired readers whose vision is impaired to the extent that they cannot read printed material. Reading Braille relies on the sense of touch, where reading is done by running a finger over a combination of characters.

A typical Braille character is comprised of six raised pins or bumps in a Braille cell grid having three rows high and two columns wide. Different combinations of the six pins represent different characters. In other applications, a Braille cell may be comprised of 8 or more Braille dots arranged in a grid four or more rows high and two columns wide.

Refreshable Braille Displays ("RBDs") are devices that allow visually impaired readers to review work or read material, which an enabled reader can do on a computer screen. RBDs range in terms of the number of characters presented on one line, but most standard displays can present in the range of from 40 to 80 cell characters at a time.

Unfortunately, many visually impaired people are forced to use the traditional audio device method to review work or read material due to the scarce supply and high cost of RBDs. This problem stems from the fact that the Braille displays currently available are very expensive to produce and maintain. These devices typically utilize a dedicated actuator for each raised character dot in a cell grid. These actuators expand when an electric potential is applied to them, producing a change in the mechanism leading to a protruding bump. Due to the complexity and intricacy of the actuators and the RBDs, repairs are expensive and inconvenient because they require the user to relinquish their unit for the duration of the repair. Because moving, mechanical parts are used, these displays receive routine maintenance and require periodic repair.

Improvements in such devices producing refreshable Braille text for tactile reading by the blind and visually impaired could broaden accessibility of computer services such as electronic books, e-mail and other network access, and general computer use to the blind. Improvements in cost and reliability would facilitate more widespread use of RBDs.

SUMMARY

Embodiments of the present invention are directed to a method and system for tactile image display. In one embodiment, a touch display system includes: a flat touch display assembly including a matrix of flat Braille pixels, wherein each flat Braille pixel is operable to be placed in one of two states; a heating source selectively connected to each flat Braille pixel; and a cooling source selectively connected to each flat Braille pixel. In one embodiment, the above described display can be used in combination with software that automatically converts text to Braille which is displayed using the tactile refreshable display.

In other embodiments the flat touch display system includes a number of Braille cells, wherein each Braille cell includes a number of the flat Braille pixels. In some embodiments the flat touch display assembly is a touch image display, and the matrix of flat Braille pixels is disposed to represent images to touch.

In other embodiments, the heating source is configured to represent Braille text by selectively heating a number of the flat Braille pixels. In some embodiments, the cooling source is configured to represent the absence of Braille text by selectively cooling a number of the flat Braille pixels.

In some embodiments, the flat touch display system includes a number of the flat Braille pixels, wherein the number of the flat Braille pixels is configured to represent images to touch by selective heating and cooling thereof. In some embodiments, the flat touch display system includes a heat conducting material configured to selectively connect the heating source and the cooling source to the matrix of flat Braille pixels.

In another embodiment, a system includes a smooth tactile display including a pattern of smooth pixels; wherein each smooth pixel includes a heating and cooling device; and an insulator surrounding each smooth pixel.

In some embodiments, the system includes a number of cells, wherein each cell includes a number of the smooth pixels. In some embodiments, the heating and cooling device of each smooth pixel is a solid-state active heat pump.

In other embodiments, the smooth pixels are configured to represent Braille text by selective heating. In some embodiments, the smooth pixels are configured to represent the absence of Braille text by selective cooling. In some embodiments, the pattern of smooth pixels is configured to display tactile images by selective heating and cooling. In some embodiments, the heating and cooling device is a Peltier element.

In another embodiment, a method includes heating a first plurality of flat Braille pixels in a flat tactile display; and cooling a second plurality of flat Braille pixels in the flat tactile display; wherein the heating and cooling forms a smooth tactile image to touch.

In other system embodiments, the forming the smooth tactile image includes forming Braille text. In some embodiments, the forming the smooth tactile image includes forming a tactile image of a visual representation.

In some system embodiments, the heating and the cooling includes heating and cooling the pluralities of flat Braille pixels using a thermoelectric heat pump. In some embodiments, the heating the first number of Braille pixels includes heating a first plurality of Peltier elements. In some embodiments, the cooling the second number of Braille pixels includes cooling a second number of Peltier elements.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

The drawings showing embodiments of the system are semi-diagrammatic and not to scale and, particularly, some of the dimensions are for the clarity of presentation and are shown exaggerated in the drawing Figures. Also, where multiple embodiments are disclosed and described having some features in common, for clarity and ease of illustration, description, and comprehension thereof, like features one to another will ordinarily be described with like reference numerals.

The term "horizontal" as used herein is defined as a plane parallel to the plane or surface of the display, regardless of its orientation. The term "vertical" refers to a direction perpendicular to the horizontal as just defined. Terms, such as "on", "above", "below", "bottom", "top", "side", "higher", "lower", "upper", "over", and "under", are defined with respect to the horizontal plane.

Some portions of the detailed descriptions, which follow, are presented in terms of procedures, steps, simulations, calculations, logic blocks, processing, and other symbolic representations of operations on data within a computer system. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Figure 1:
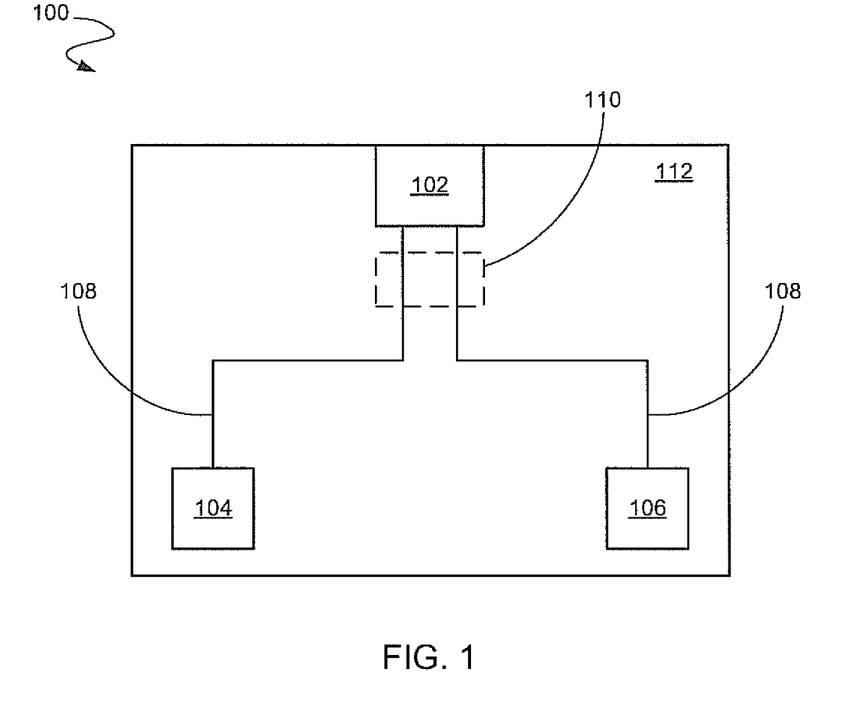
FIG. 1 is diagram of a point heating and cooling device, according to an embodiment of the present invention.

FIG. 1 is a diagram of a point heating and cooling device 100, according to an embodiment of the present invention. The point heating and cooling device 100 may be used to convert visual information into touch information. For example, a number of point heating and cooling devices may be arranged to represent Braille characters in a tactile display. Hot areas of the tactile display would represent Braille characters, and cold areas of the tactile display would represent the absence of Braille characters. Visually impaired people would read the display through tactile recognition of the Braille hot areas, e.g. via touch.

In an embodiment, a pixel 102 is connected to a heat source 104 and a cooling source 106. A heat conductor 108 rapidly transfers heat to the pixel 102 from the heat source 104. In addition, the heat conductor 108 rapidly transfers heat from the pixel 102 to the cooling source 106. In an embodiment, the heat conductor 108 is metallic, for example copper, or a metallic or non-metallic super heat conductor, for example carbon nanotubes.

In an embodiment, a control gate 110 and an insulator 112 control the transfer of heat to and from the pixel 102. The insulator 112 thermally isolates the pixel 102, the heat source 104, the cooling source 106, and the heat conductor 108. The control gate 110 selectively prevents or allows heat to transfer between the pixel 102 and the heat source 104 or the cooling source 106.

Figure 2A:
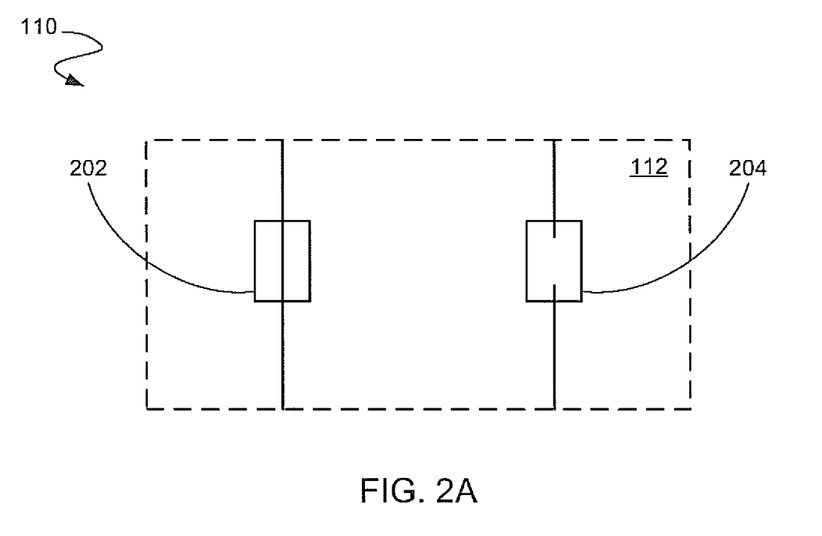
FIG. 2A is a magnified diagram of the control gate (FIG. 1) allowing heating of the pixel (FIG. 1), according to an embodiment of the present invention.

FIG. 2A is a magnified diagram of the control gate 110 allowing heating of the pixel 102 (FIG. 1). The control gate 110 includes a first control 202 and a second control 204. The first control 202, for example a switch, is turned on, allowing heat to transfer from the heat source 104 (FIG. 1) to the pixel 102 (FIG. 1). The second control 204, for example a switch, is turned off, preventing heat from transferring from the pixel 102 (FIG. 1) to the cooling source 106 (FIG. 1). The insulator 112 thermally isolates the first control 202 and the second control 204.

Figure 2B:
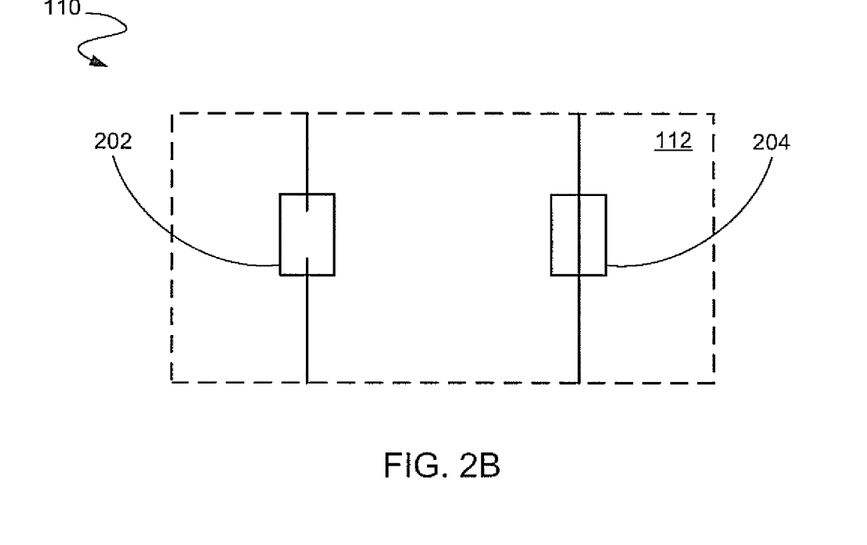
FIG. 2B is a magnified diagram of the control gate (FIG. 1) allowing cooling of the pixel (FIG. 1), according to an embodiment of the present invention.

FIG. 2B is a magnified diagram of the control gate 110 allowing cooling of the pixel 102 (FIG. 1). The first control 202 is turned off, preventing heat from transferring from the heat source 104 (FIG. 1) to the pixel 102 (FIG. 1). The second control 204 is turned on, allowing heat to transfer from the pixel 102 (FIG. 1) to the cooling source 106 (FIG. 1). The insulator 112 thermally isolates the first control 202 and the second control 204.

Figure 3:
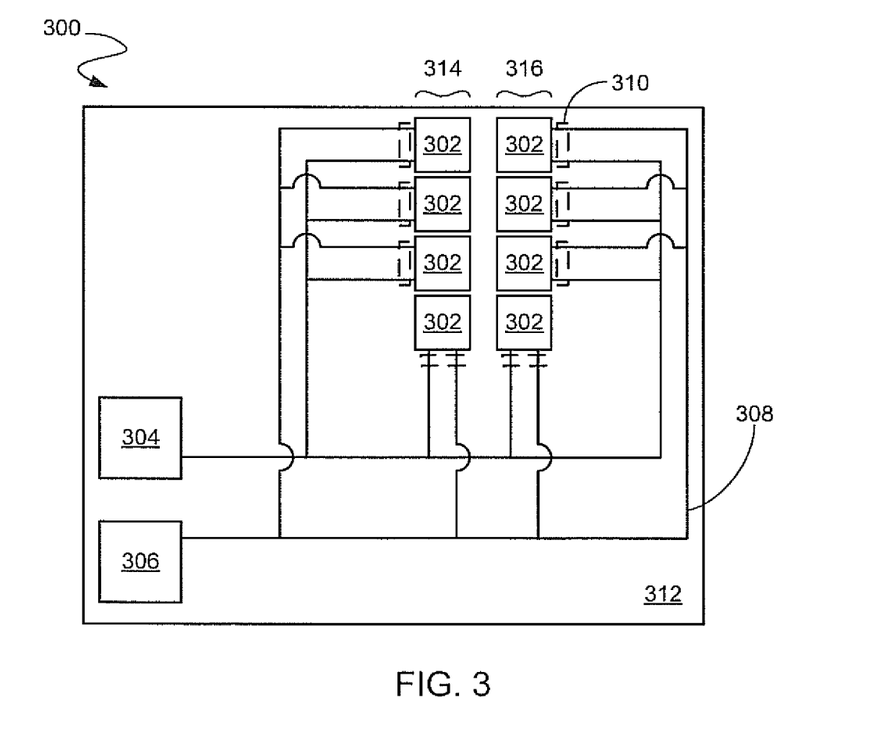
FIG. 3 is a diagram of an exemplary eight point Braille heating and cooling device, according to an embodiment of the present invention.

FIG. 3 is a diagram of an exemplary eight point Braille heating and cooling device 300, according to an embodiment of the present invention. The eight point Braille heating and cooling device 300 includes a number of pixels 302 connected to a heat source 304 and a cooling source 306. A heat conductor 308 rapidly transfers heat to the pixels 302 from the heat source 304. In addition, the heat conductor 308 rapidly transfers heat from the pixels 302 to the cooling source 306.

In an embodiment, control gates 310 and an insulator 312 selectively control the transfer of heat to and from the pixels 302. The insulator thermally isolates the pixels 302, the heat source 304, the cooling source 306, and the heat conductor 308. The control gates 310 selectively prevent or allow heat to transfer between the pixels 302 and the heat source 304 or the cooling source 306.

Therefore, the eight point Braille heating and cooling device 300 can simultaneously heat, for example, a first group of pixels 314 and cool a second group of pixels 316. Braille characters are formed in the Braille cell by selectively heating pixels corresponding to Braille dot characters. "Non-heated" pixels are cooled, thus improving the contrast and tactile readability of the Braille character. In alternate embodiments, an exemplary six dot Braille heating and cooling device could display Braille characters by heating and cooling a six dot array or selectively heating and cooling six dots within the eight dot array. In addition, in alternate embodiments, the amount of heating and cooling of the pixels can be adjusted by a user.

Figure 4:
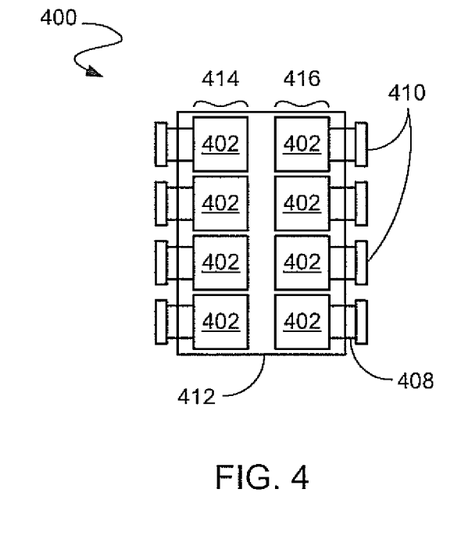
FIG. 4 is a diagram of an exemplary eight point Braille heating and cooling device, according to an embodiment of the present invention.

FIG. 4 is a diagram of an exemplary eight point Braille heating and cooling device 400, according to an embodiment of the present invention. The eight point Braille heating and cooling device 400 includes a number of pixels 402. The pixels 402 are solid-state active heat pumps, for example Peltier elements. Wires 408 electrically connect the pixels 402 to power control units 410. Thus, the pixels 402 actively heat or cool in response to electrical input from the power control units 410. An insulator 412 thermally isolates the pixels 402.

Therefore, the eight point Braille heating and cooling device 400 can simultaneously heat, for example, a first group of pixels 414 and cool a second group of pixels 416. Braille characters are formed in the Braille cell by selectively heating pixels corresponding to Braille dot characters. Non-heated pixels are cooled, thus improving the contrast and tactile readability of the Braille character. In alternate embodiments, a six dot Braille heating and cooling device could display Braille characters by heating and cooling a six dot array or selectively heating and cooling six dots within the eight dot array.

Figure 5:
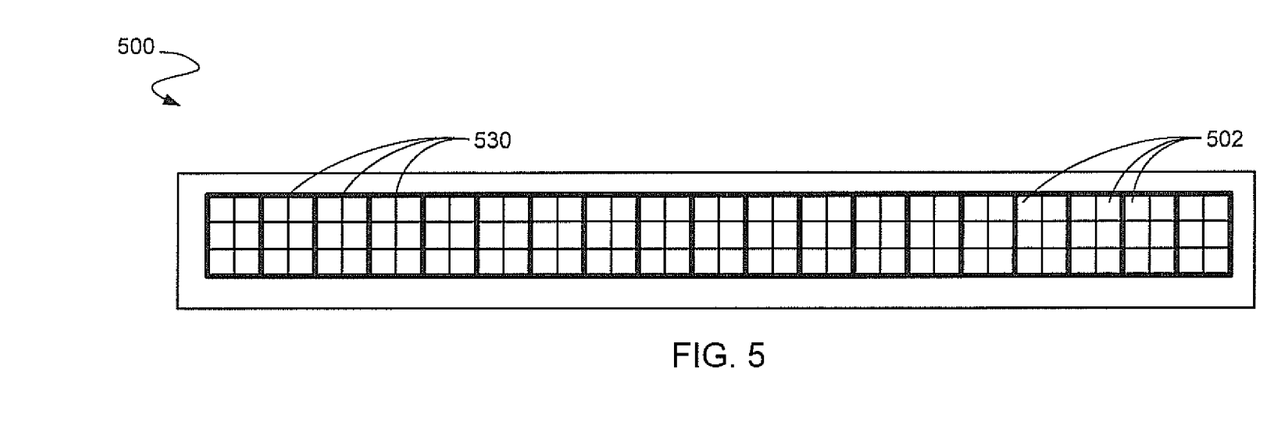
FIG. 5 is a plan view of a portion of a flat Braille text display, according to an embodiment of the present invention.

FIG. 5 is a plan view of a portion of a flat Braille text display 500, according to an embodiment of the present invention. The flat Braille text display 500 is a one line, six dot code tactile display. Thus, groups of six pixels 502 are arranged into cells 530. Each cell 530 may display one six dot Braille character. However, in alternate embodiments the flat Braille text display 500 may display any number of dot codes, for example a Braille eight dot code.

As described above, pixels 502 display Braille characters by heating and cooling. The flat Braille text display 500 may receive text to display from a variety of sources. For example, a computer, an optical character recognition device, downloadable content, etc.

As a visually impaired individual's hands move along the display, Braille characters displayed in the cells 530 are read by the hands, either left to right or right to left. When the hands reach the end of the flat Braille text display 500, the flat Braille text display 500 displays a new line of Braille text by heating and cooling a different combination of pixels 502 within the cells 530.

In an embodiment, the flat Braille text display 500 displays new Braille text immediately or shortly after the hands have passed over and read a Braille character, and before the hands have reached the end of the flat Braille text display 500. In an embodiment, a user may select the how quickly or under what circumstances the flat Braille text display 500 displays new text.

Figure 6:
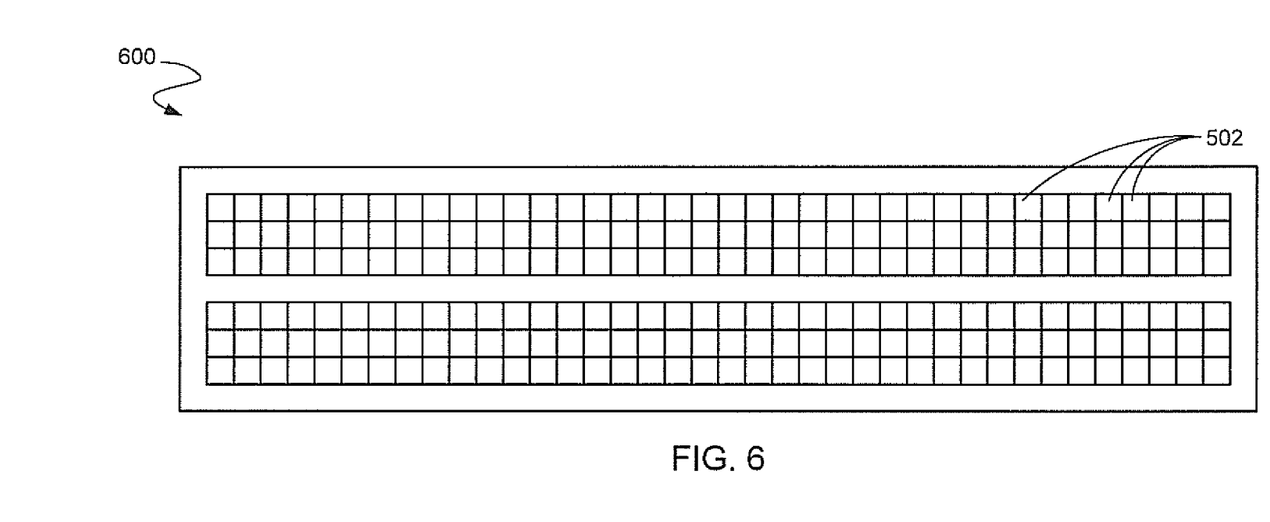
FIG. 6 is a plan view of a portion of a multi-line flat Braille text display, according to an embodiment of the present invention.

FIG. 6 is a plan view of a portion of a multi-line flat Braille text display 600, according to an embodiment of the present invention. The multi-line flat Braille text display 600 is two line, six dot code tactile display. However, in alternate embodiments the multi-line flat Braille text display 600 may display any number of dot codes, for example a Braille eight dot code. In addition, the multi-line flat Braille text display 600 may have any number of display lines.

As described above, a visually impaired individual's hands move along the display, reading Braille characters. When the hands reach the end of a line or begin a new line of the multi-line flat Braille text display 600, the multi-line flat Braille text display 600 displays a new line of Braille text by heating and cooling a different combination of pixels 602 in the line just read. In an embodiment, the pixels 602 do not form a set pattern of cells 530 (FIG. 5). Instead any combination of pixels 602 may form Braille characters.

In an embodiment, the multi-line flat Braille text display 600 displays new Braille text immediately or shortly after the hands have read a Braille character, and before the hands have reached the end of a line of the multi-line flat Braille text display 600. In an embodiment, a user may select the how quickly or under what circumstances the multi-line flat Braille text display 600 displays new text.

In some embodiments, a user can read a line of the multi-line flat Braille text display 600 faster than the multi-line flat Braille text display 600 can refresh the line with new text by heating and cooling. In this case, the multi-line flat Braille text display 600 provides feedback to the user, indicating that the refresh has completed. For example, in an embodiment an audio signal and/or a tactile signal indicates that the refresh has completed. The tactile signal can be a designated location on the multi-line flat Braille text display 600, indicating by point heating or cooling that the refresh has completed. The tactile signal can alternate between hot and cold each time, so that the user can easily tell the difference between refreshes. In an embodiment, the designated location for the tactile signal can also be used as a place for the user to configure the temperature of the hot and cold points.

Figure 7:
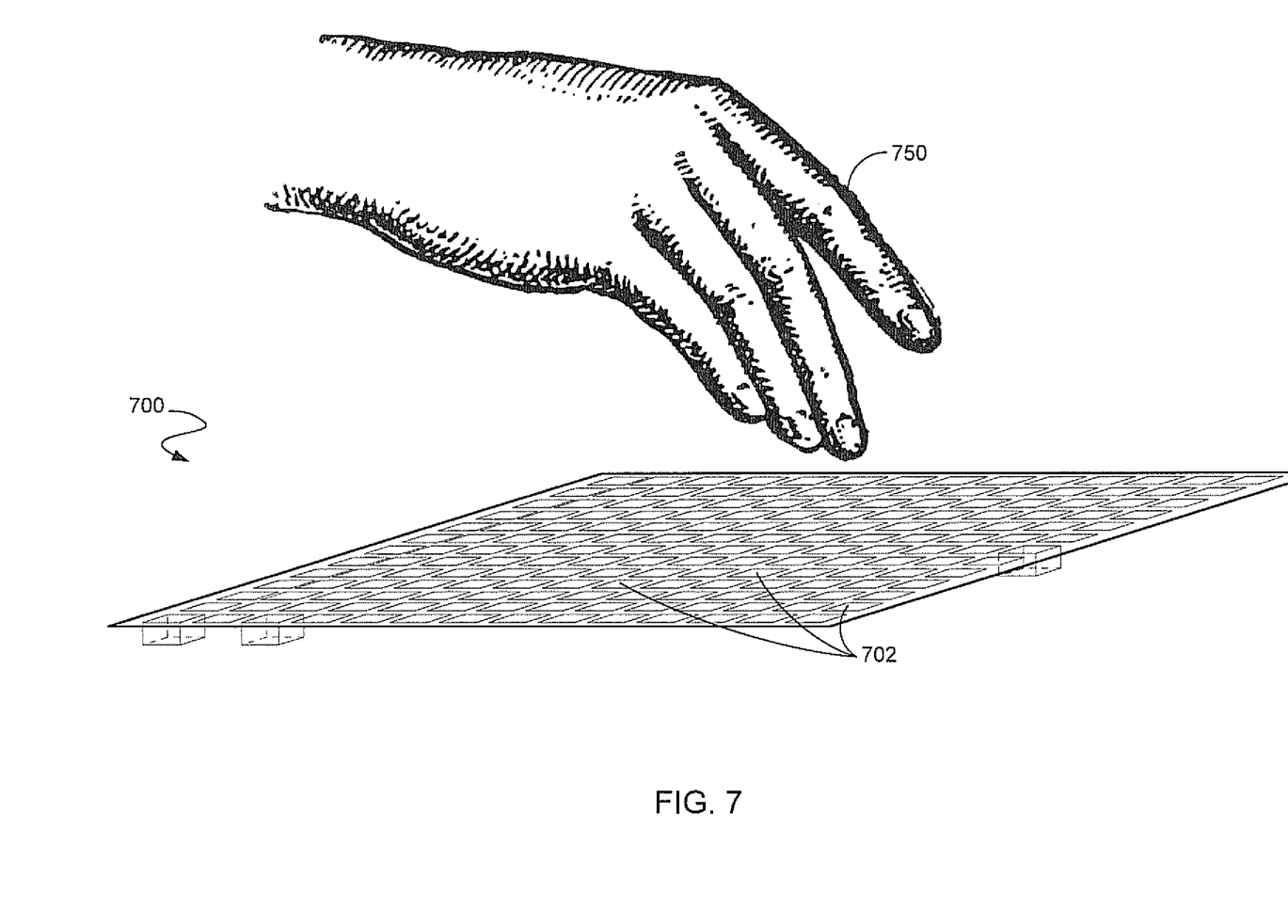
FIG. 7 is a graphical depiction of a portion of a flat tactile display, according to an embodiment of the present invention.

FIG. 7 is a graphical depiction of a portion of a flat tactile display 700, according to a matrix embodiment of the present invention. The flat tactile display 700 is a 14 by 13 matrix of flat pixels 702. However, in alternate embodiments flat tactile display 700 may be any sized matrix of flat pixels 702.

The pixels 702 heat and cool, displaying Braille characters as described above. In addition, the flat tactile display 700 may also display tactile images. For example, the flat tactile display 700 may display a tactile pattern of pixels 702 in the shape of a dog, an airplane, a photograph, a computer display screen, etc. Instead of only reading lines of text, a visually impaired individual's hands 750 read the entire flat tactile display 700, containing images, text, images and text, moving images, etc. For example, the flat tactile display 700 may be connected to a computer and form a tactile representation of the visual computer screen, thus enabling the visually impaired to navigate the internet.

Figure 8:
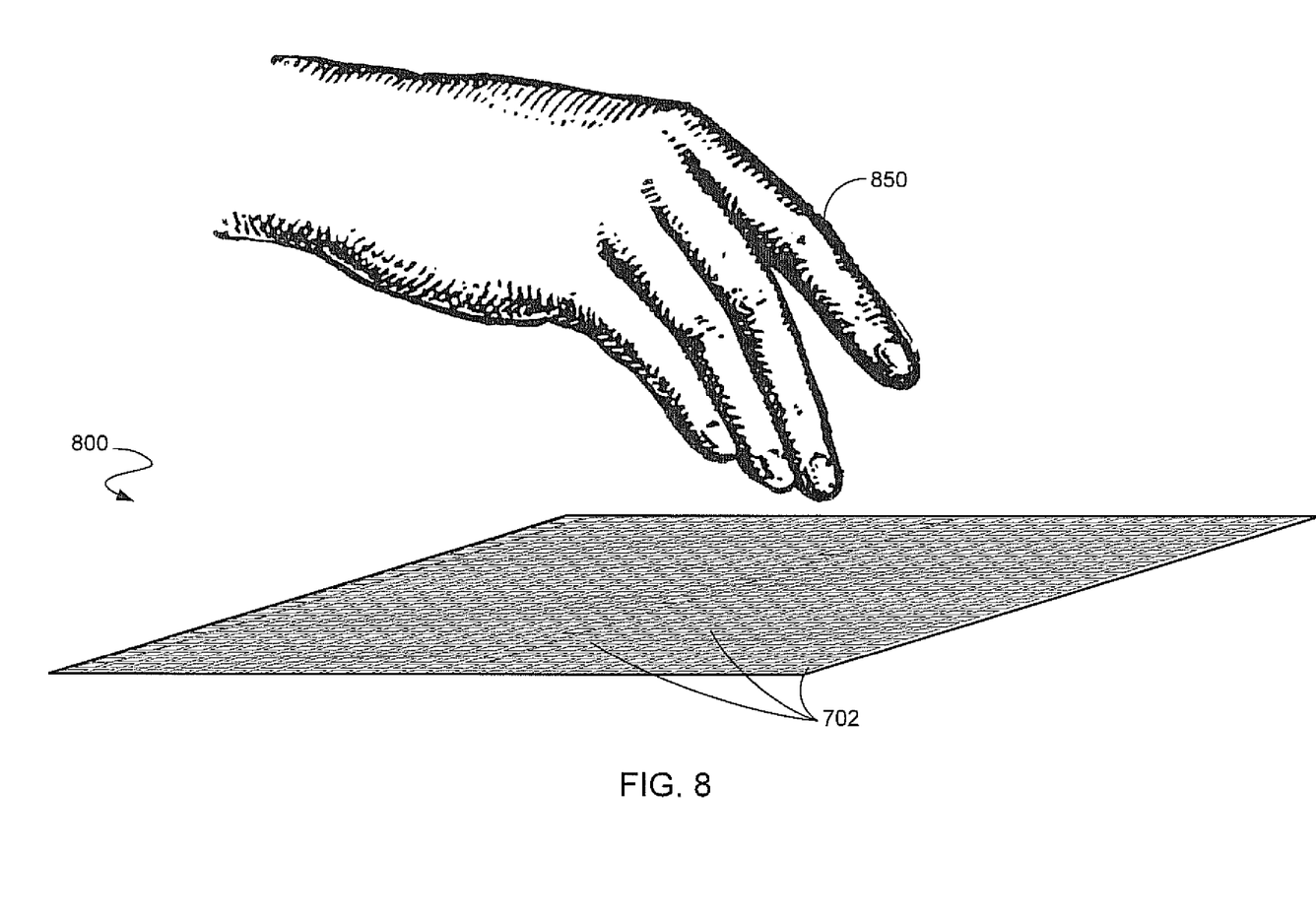
FIG. 8 is a graphical depiction of a portion of a flat tactile display, according to an embodiment of the present invention.

FIG. 8 is a graphical depiction of a portion of a flat tactile display 800, according to a matrix embodiment of the present invention. The flat tactile display 800 is a higher resolution 28 by 26 matrix of pixels than the 14 by 13 matrix previously described.

As previously described, the pixels 802 heat and cool, displaying Braille characters and/or images. As the resolution increases the pixels 802 may get smaller, the level of detail increases, and the amount of information that can be displayed increases. However, if the pixels 802 are too small, a single pixel may be unreadable by a visually impaired individual's hands 850. Therefore, in an embodiment multiple pixels 802 may be used to create a single point of Braille text. For example, an eight dot code might require 32 pixels of the flat tactile display 800.

Figure 9:
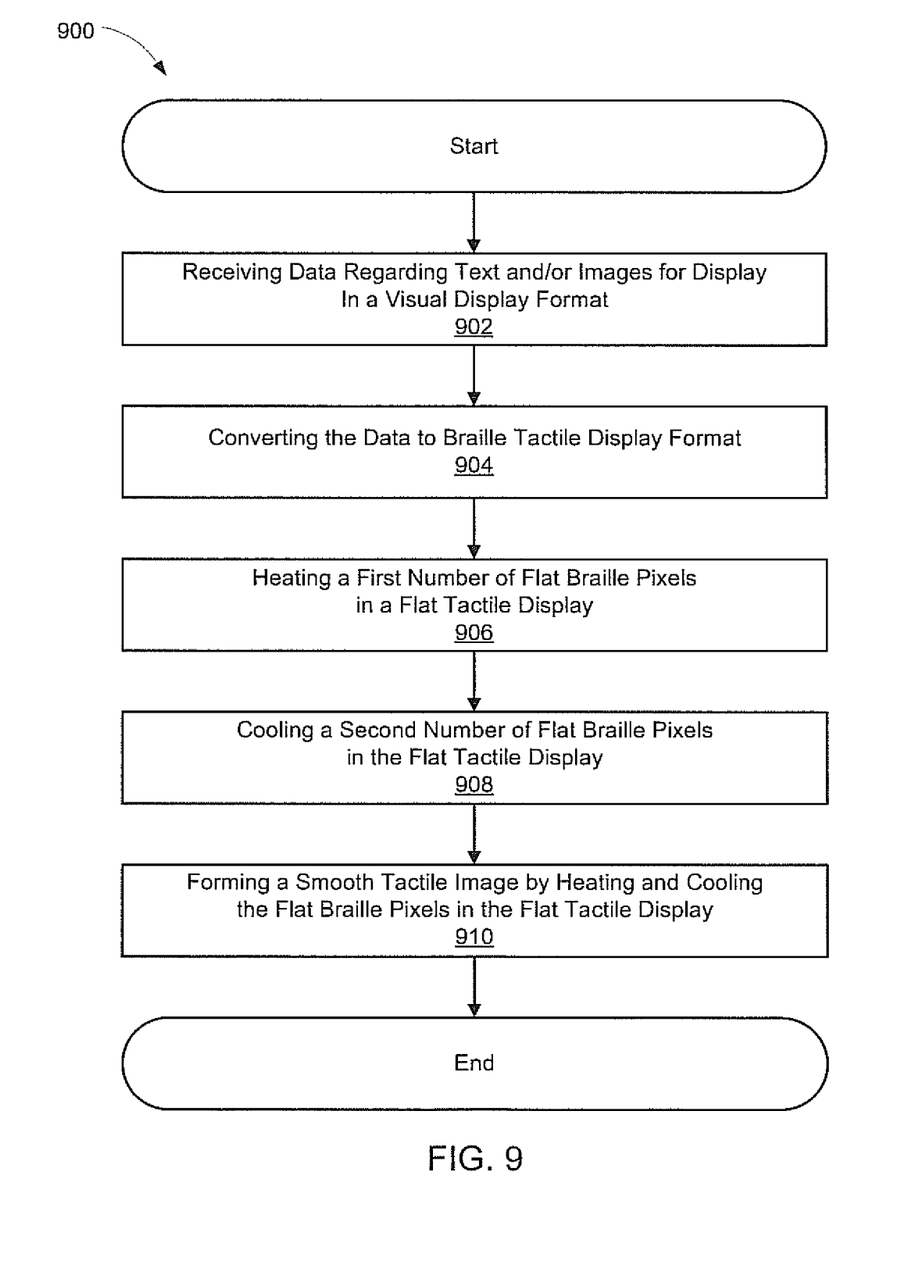
FIG. 9 depicts a flowchart of an exemplary computer implemented method of thermal tactile display according to an embodiment of the present invention.

FIG. 9 depicts a flowchart 900 of an exemplary method of thermal tactile display according to an embodiment of the present invention. Although specific steps are disclosed in the flowchart 900, such steps are exemplary. That is, embodiments of the present invention are well-suited to performing various other steps or variations of the steps recited in the flowchart 900.

In a step 902, data is received regarding text and/or images for display in a visual display format. For example, in FIG. 5 the flat Braille text display may receive information from a computer, an optical character recognition device, downloadable content from the internet, etc. Thus, the data may include web pages constructed of images and text.

In a step 904, the data is converted into a Braille tactile display format. For example, a converter converts text into Braille data format for display on a flat touch display assembly. Thus, the web page image and text information is converted into touch recognizable images and text, e.g. Braille.

In a step 906, a first number of flat Braille pixels are heated in a flat tactile display. For example, in FIG. 5 a smooth tactile display includes a pattern of smooth pixels. Thus, the flat touch display assembly includes a matrix of flat Braille pixels, wherein each flat Braille pixel is operable to be placed in one of two states.

In an embodiment, the flat touch display assembly is a touch image display, and the matrix of flat Braille pixels is disposed to represent images to touch. In an embodiment, an insulator surrounds each smooth pixel, for example FIG. 3. In addition, FIG. 3 illustrates a heat conducting material that is configured to selectively connect the heating source and the cooling source to the matrix of flat Braille pixels.

Each smooth pixel includes a heating and cooling device. The heating source is selectively connected to each flat Braille pixel. For example as described in FIG. 4, the heating and cooling device of each smooth pixel may be a solid-state active heat pump, e.g. a Peltier element. The heating source is configured to represent Braille text by selectively heating a plurality of the flat Braille pixels. Thus, the smooth pixels are configured to represent Braille text by selective heating.

In a step 908, a second number of flat Braille pixels are cooled in the flat tactile display by a cooling source selectively connected to each flat Braille pixel. For example, in FIG. 5 the smooth pixels are configured to represent the absence of Braille text by selective cooling. Thus, the cooling source is configured to represent the absence of Braille text by selectively cooling a number of the flat Braille pixels.

In a step 910, the heating and cooling of the flat Braille pixels forms a smooth tactile image. For example, in FIG. 5 the touch display system includes a number of Braille cells. Each Braille cell includes a number of the smooth flat Braille pixels. Thus, in FIG. 5 the forming a smooth tactile image includes forming Braille text.

In an embodiment, a pattern of smooth pixels is configured to display tactile images by selective heating and cooling. For example, in FIG. 7 a number of flat Braille pixels is configured to represent images to touch by selective heating and cooling thereof. Thus, the forming a smooth tactile image includes forming a tactile image of a visual representation. In addition as illustrated in FIG. 7, the heating and cooling of a plurality of flat Braille pixels may be done by a heat pump. For example, Peltier elements may heat a first plurality of Braille pixels, and Peltier elements may cool a second plurality of Braille pixels.

Figure 10:
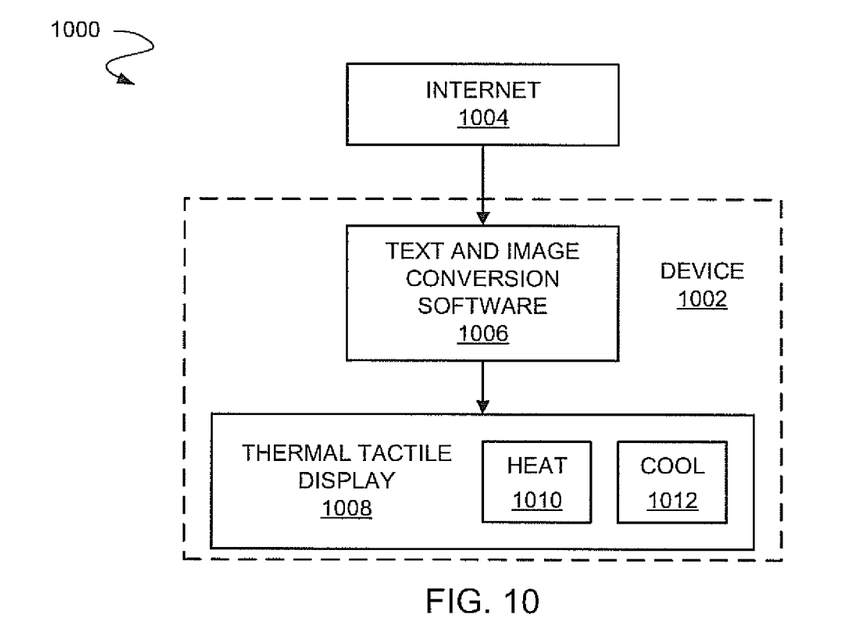
FIG. 10 is, a schematic overview of a computer implemented tactile display system suitable for implementing embodiments of the present invention.

FIG. 10 is a schematic overview of a computer implemented tactile display system 1000 suitable for implementing embodiments of the present invention. A flat tactile display device 1002 receives text and image information for display, for example from the internet 1004. The flat tactile display device 1002 includes text and image conversion software 1006 and a thermal tactile display 1008.

The text and image conversion software 1006 converts the text and image information from the internet 1004 into tactile information, for example converting visual text into Braille text. The thermal tactile display 1008 uses heaters 1010 and coolers 1012 to display the tactile information from the text and image conversion software 1006.

Figure 11:
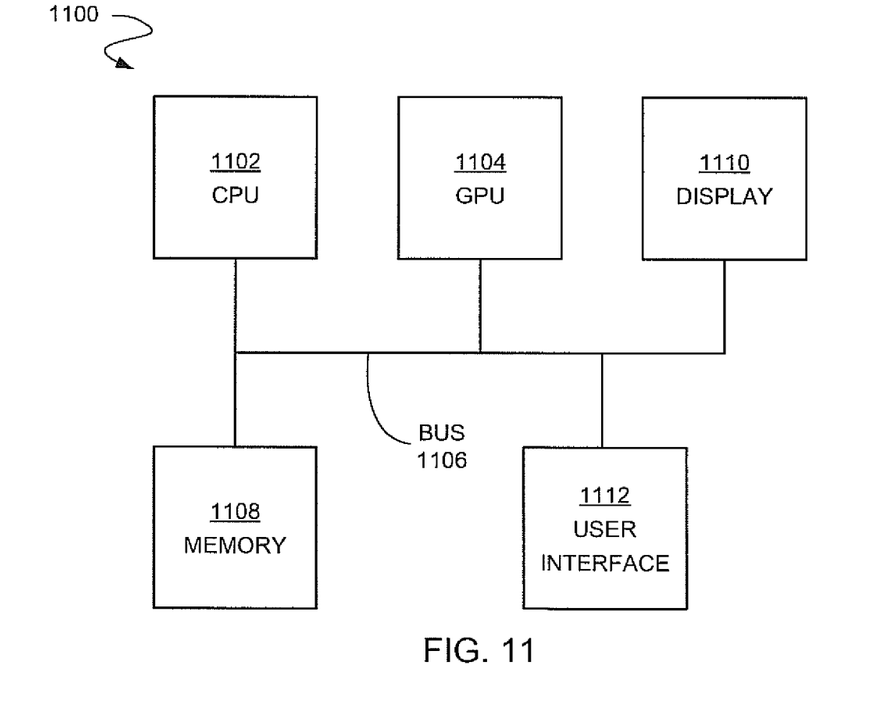
FIG. 11 is a block diagram of an example of a general purpose computer system within which a touch display system in accordance with the present invention can be implemented.

FIG. 11 is a block diagram of an example of a general purpose computer system 1100 within which a touch display system in accordance with the present invention can be implemented. In the example of FIG. 11, the system includes a host central processing unit (CPU) 1102 coupled to a graphics processing unit (GPU) 1104 via a bus 1106. One or more CPUs as well as one or more GPUs may be used.

Both the CPU 1102 and the GPU 1104 are coupled to memory 1108. In the example of FIG. 11, the memory 1108 may be a shared memory, whereby the memory stores instructions and data for both the CPU 1102 and the GPU 1104. Alternatively, there may be separate memories dedicated to the CPU 1102 and GPU 1104, respectively. The memory 1108 can also include a video frame buffer for storing pixel data that drives a coupled display 1110.

The display 1110 may be a flat Braille text display, for example FIG. 6, and/or a flat tactile display, for example FIG. 7. The display 1110 may also include a visual monitor that can also be used, as for example by a repair technician and/or family members who are not visually impaired.

The system 1100 also includes a user interface 1112 that, in one implementation, includes an on-screen cursor control device. The user interface may include a keyboard, a Braille keyboard, a mouse, a joystick, game controller, and/or a touch screen device (a touchpad).

Generally speaking, the system 1100 includes the basic components of a computer system platform that implements functionality in accordance with embodiments of the present invention. The system 1100 can be implemented as, for example, any of a number of different types of computer systems (e.g., servers, laptops, desktops, notebooks, and gaming systems), as well as a home entertainment system (e.g., a DVD player) such as a set-top box or digital television, or a portable or handheld electronic device (e.g., a portable phone, personal digital assistant, or handheld gaming device).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A touch display system comprising:
   a flat touch display assembly comprising a matrix of flat Braille pixels, wherein each flat Braille pixel is operable to be placed in one of two states while remaining flat in both states, the states including a first state in which the flat pixel has a first temperature and a second state in which the flat pixel has a second temperature lower than the first temperature;
   a heating source selectively connected to each flat Braille pixel to render the pixel into the first state; and
   a cooling source selectively connected to each flat Braille pixel to render the pixel into the second state.

2. The system of claim 1 further comprising a plurality of Braille cells wherein each Braille cell comprises a plurality of said flat Braille pixels.

3. The system of claim 1 wherein:
   said flat touch display assembly is a touch image display; and
   said matrix of flat Braille pixels is disposed to represent images to touch.

4. The system of claim 1 wherein said heating source is configured to represent Braille text by selectively heating a plurality of said flat Braille pixels.

5. The system of claim 1 wherein said cooling source is configured to represent the absence of Braille text by selectively cooling a plurality of said flat Braille pixels.

6. The system of claim 1 further comprising a convertor for converting text into Braille data format for display on said flat touch display assembly, and a plurality of said flat Braille pixels, wherein said plurality of said flat Braille pixels is configured to represent images to touch by selective heating and cooling thereof.

7. The system of claim 1 further comprising a heat conducting material configured to selectively connect said heating source and said cooling source to said matrix of flat Braille pixels.

8. A method comprising:
   heating a first plurality of flat Braille pixels in a flat tactile display to heat a flat Braille pixel without rendering the Braille pixel non-flat; and
   cooling a second plurality of flat Braille pixels in said flat tactile display; wherein
   said heating and said cooling forms a smooth tactile image to touch.

9. The method of claim 8 further comprising converting text into Braille data format for display on said flat tactile display, and wherein said forming said smooth tactile image comprises forming Braille text.

10. The method of claim 8 wherein said forming said smooth tactile image comprises forming a tactile image of a visual representation.

11. The method of claim 8 wherein said heating and said cooling comprises heating and cooling said pluralities of flat Braille pixels using a thermoelectric heat pump.

12. The method of claim 8 wherein said heating said first plurality of Braille pixels comprises heating a first plurality of Peltier elements.

13. The method of claim 8 wherein said cooling said second plurality of Braille pixels comprises cooling a second plurality of Peltier elements.

* * * * *